US012632158B2

(12) United States Patent
Jin et al.

(10) Patent No.: US 12,632,158 B2
(45) Date of Patent: May 19, 2026

(54) INFORMATION ACQUISITION METHOD AND DEVICE, STORAGE MEDIUM AND ELECTRONIC APPARATUS

(71) Applicants: Beijing Zitiao Network Technology Co., Ltd., Beijing (CN); DOUYIN VISION CO., LTD., Beijing (CN)

(72) Inventors: Lei Jin, Beijing (CN); Liangkai Zhou, Beijing (CN); Haiyang Huang, Beijing (CN); Yuchen Qian, Beijing (CN)

(73) Assignees: Beijing Zitiao Network Technology Co., Ltd., Beijing (CN); DOUYIN VISION CO., LTD., Beijing (CN)

( * ) Notice: Subject to any disclaimer, the term of this patent is extended or adjusted under 35 U.S.C. 154(b) by 222 days.

(21) Appl. No.: 18/512,491

(22) Filed: Nov. 17, 2023

(65) Prior Publication Data

US 2024/0168607 A1 May 23, 2024

(30) Foreign Application Priority Data

Nov. 17, 2022 (CN) .......................... 202211458600.3

(51) Int. Cl.
*G06F 3/0482* (2013.01)
(52) U.S. Cl.
CPC .................................. *G06F 3/0482* (2013.01)
(58) Field of Classification Search
CPC .................................................... G06F 3/0482
See application file for complete search history.

(56) References Cited

U.S. PATENT DOCUMENTS 7,191,411 B2 * 3/2007 Moehrle ............... G06F 3/0482
715/847
2010/0023862 A1 * 1/2010 Tai ........................ G06F 16/583
715/721
(Continued)

FOREIGN PATENT DOCUMENTS

CN 102084362 A 6/2011
CN 103034675 A 4/2013
(Continued)

OTHER PUBLICATIONS

Notice of Third Review Opinion for Chinese Application No. 202211458600.3, mailed Feb. 25, 2025, 20 Pages.
(Continued)

*Primary Examiner* — Cao H Nguyen

(57) ABSTRACT

Embodiments of the present disclosure provide an information acquisition method and device, a storage medium and an electronic apparatus. Herein, the method comprises: in response to a preset trigger operation, displaying an information acquisition page which includes therein at least one level of display information; in response to a trigger operation on any one piece of the display information, displaying at least part of same-level display information corresponding to selected display information, and/or displaying at least part of next-level display information of the selected display information, wherein the displayed display information of each level is selectable display information; in the case of detecting that a selection ending condition is satisfied, determining target acquisition information based on the selected display information of each level.

20 Claims, 5 Drawing Sheets

Select Themes of Interest

Theme Tag 1          Theme Tag 4

Theme Tag 2          Theme Tag 5

Theme Tag 3          Theme Tag 6

(56) References Cited

U.S. PATENT DOCUMENTS

| | | | | |
|---|---|---|---|---|
| 2010/0205210 | A1* | 8/2010 | Gras | G06F 16/748 |
| | | | | 707/E17.115 |
| 2013/0088499 | A1* | 4/2013 | Sato | G06F 16/9027 |
| | | | | 345/501 |
| 2013/0174041 | A1* | 7/2013 | Chakravarthy | G06F 3/0482 |
| | | | | 715/733 |
| 2014/0317117 | A1 | 10/2014 | Cao et al. | |
| 2021/0182558 | A1 | 6/2021 | Kim et al. | |

FOREIGN PATENT DOCUMENTS

| | | | |
|---|---|---|---|
| CN | 103377200 | A | 10/2013 |
| CN | 105939495 | A | 9/2016 |
| CN | 110765737 | A | 2/2020 |
| CN | 111046188 | A | 4/2020 |
| CN | 111434118 | A | 7/2020 |
| CN | 111966900 | A | 11/2020 |
| CN | 114880572 | A | 8/2022 |
| CN | 115826816 | A | 3/2023 |
| JP | 2017-028465 | A | 2/2017 |
| WO | 2011/146311 | A1 | 11/2011 |

OTHER PUBLICATIONS

Office action received from Chinese patent application No. 202211458600.3 mailed on Nov. 18, 2024, 18 pages (8 pages English Translation and 10 pages Original Copy).

Office action received from Chinese patent application No. 202211458600.3 mailed on Sep. 27, 2024, 18 pages (9 pages English Translation and 9 pages Original Copy).

* cited by examiner

Select Themes of Interest

Theme Tag 1    Theme Tag 4

Theme Tag 2    Theme Tag 5

Theme Tag 3    Theme Tag 6

Fig.1

Select Media Data of Interest

| | | |
|---|---|---|
| Associated Image 1 | Associated Image 2 | Associated Image 3 |
| Associated Image 4 | Associated Image 5 | Associated Image 6 |
| Associated Image 7 | Associated Image 8 | Associated Image 9 |
| Associated Image 10 | Associated Image 11 | Associated Image 12 |

Fig.2

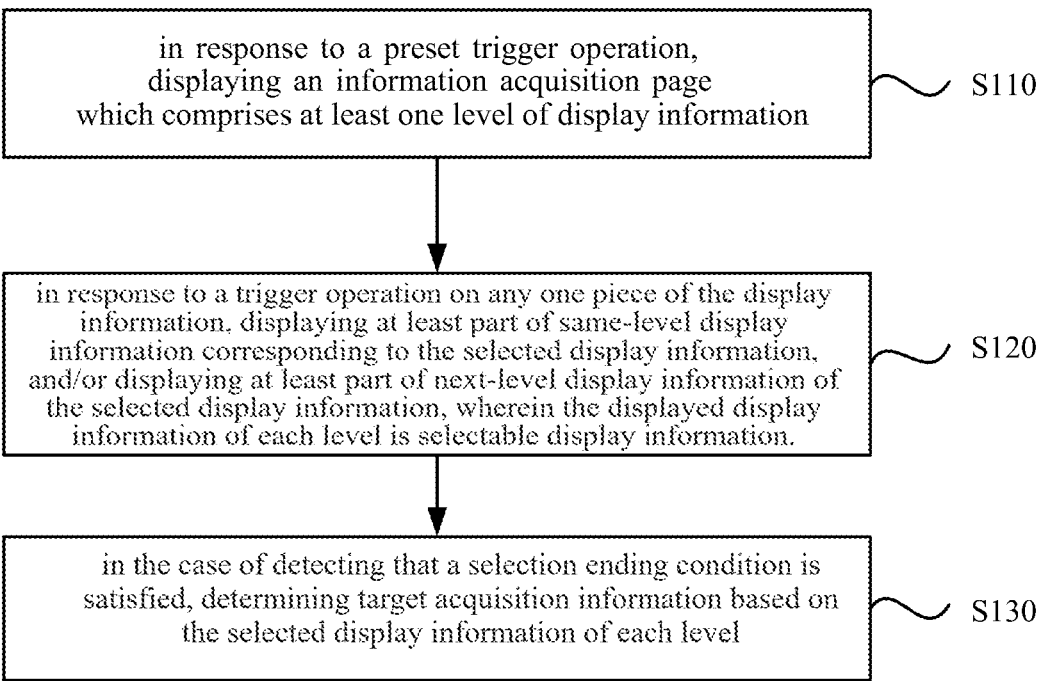

in response to a preset trigger operation,
displaying an information acquisition page
which comprises at least one level of display information    S110 in response to a trigger operation on any one piece of the display
information, displaying at least part of same-level display
information corresponding to the selected display information,
and/or displaying at least part of next-level display information of
the selected display information, wherein the displayed display
information of each level is selectable display information.    S120 in the case of detecting that a selection ending condition is
satisfied, determining target acquisition information based on
the selected display information of each level    S130

Fig.3

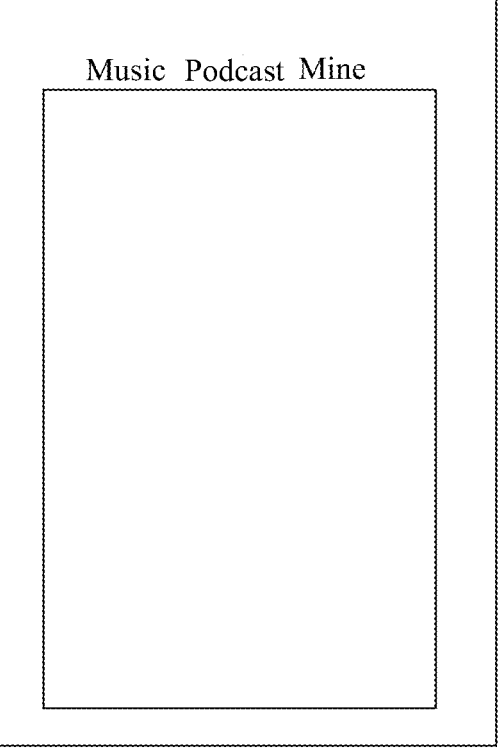

Music  Podcast  Mine

Fig.4

Select Themes of Interest

Theme Tag 1

| Sub-tag 1 | Sub-tag 2 | Sub-tag 3 |
|---|---|---|

Theme Tag 2

Theme Tag 3

Fig.5a

Select Themes of Interest

Theme Tag 1

| Associated Image 1 | Associated Image 2 | Associated Image 3 |
|---|---|---|

Theme Tag 2

Theme Tag 3

Fig.5b

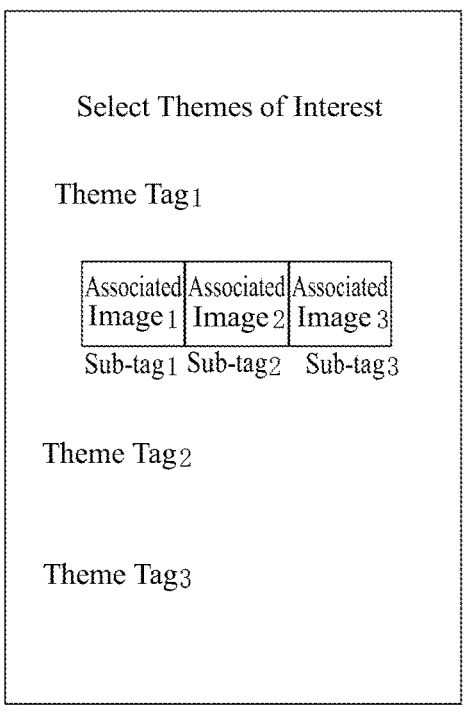
Fig.5c
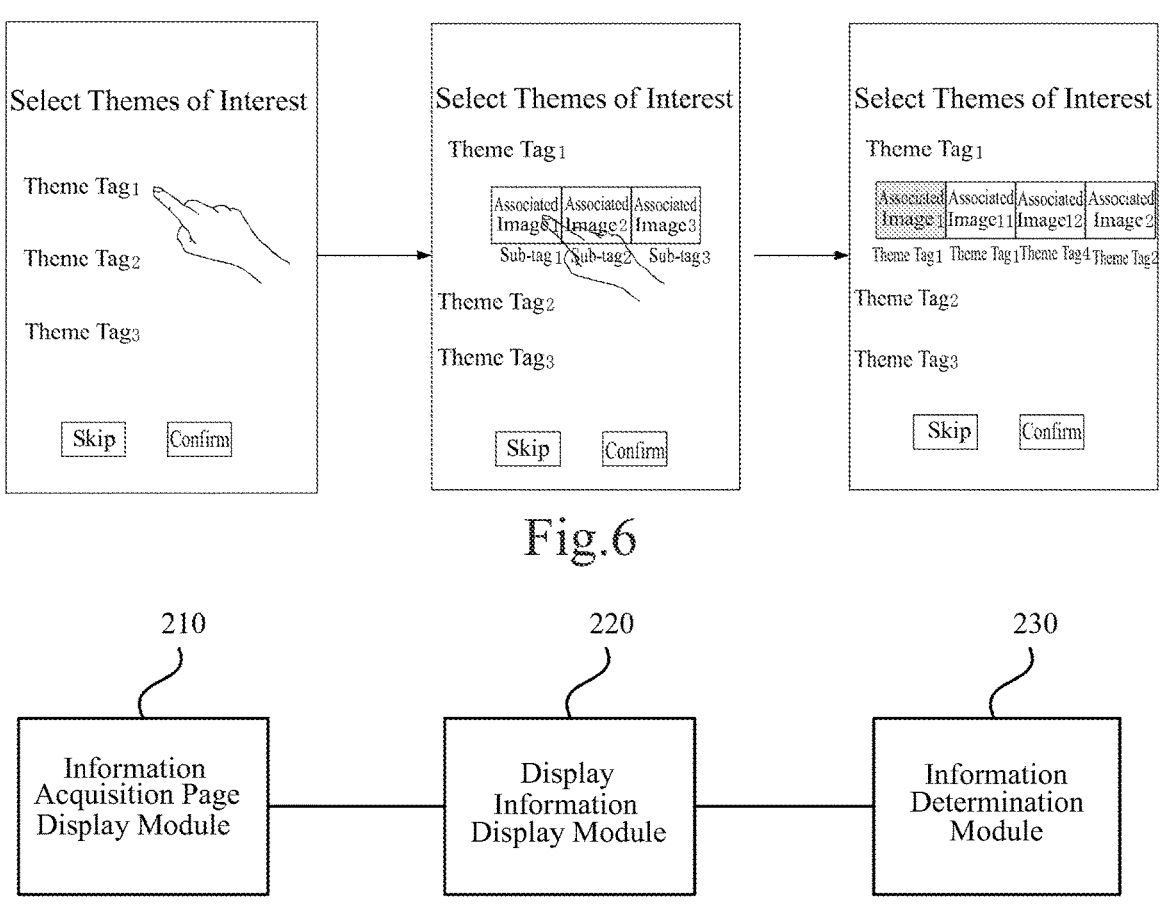
Fig.6
Fig.7

1

INFORMATION ACQUISITION METHOD AND DEVICE, STORAGE MEDIUM AND ELECTRONIC APPARATUS

CROSS-REFERENCE TO RELATED APPLICATIONS

The present application is based on and claims priority of CN Application No. 202211458600.3, filed on Nov. 17, 2022, the disclosure of which is incorporated by reference herein in its entirety.

TECHNICAL FIELD

Embodiments of the present disclosure relate to computer technology, and in particular, to an information acquisition method and device, a storage medium and an electronic apparatus.

BACKGROUND

With the continuous development of computer technology, a user can start an application program and use the same through downloading and registration.

After completion of the registration of the application program, the user is regarded as a new user of the application program. The application program acquires the interest information of the new user on the resources in the application program through the information acquisition page.

SUMMARY

The present disclosure provides an information acquisition method and device, a storage medium and an electronic apparatus to achieve an improvement in the accuracy of information acquisition.

In a first aspect, the embodiments of the present disclosure provide an information acquisition method, comprising:

in response to a preset trigger operation, displaying an information acquisition page which comprises at least one level of display information;

in response to a trigger operation on any one piece of the display information, displaying at least part of same-level display information corresponding to the selected display information, and/or displaying at least part of next-level display information of the selected display information, wherein the displayed display information of each level is selectable display information;

in the case of detecting that a selection ending condition is satisfied, determining target acquisition information based on the selected display information of each level.

In a second aspect, the embodiments of the present disclosure provides an information acquisition device, comprising:

an information acquisition page display module configured to, in response to a preset trigger operation, display an information acquisition page which comprises at least one level of display information;

a display information display module configured to, in response to a trigger operation on any one piece of the display information, display at least part of the same-level display information corresponding to the selected display information, and/or display at least part of the next-level display information of the selected display information, wherein the displayed display information of each level is selectable display information; and

an information determination module configured to, in the case of detecting that a selection ending condition is satisfied, determine target acquisition information based on the selected display information of each level.

In a third aspect, embodiments of the present disclosure further provide an electronic apparatus, comprising:

one or more processors;

a storage means to store one or more programs which, when executed by the one or more processors, enable the one or more processors to implement an information acquisition method as provided by any embodiment of the present disclosure.

In a fourth aspect, the embodiments of the present disclosure further provide a storage medium containing computer-executable instructions which, when executed by a computer processor, are configured to implement an information acquisition method as provided by any embodiment of the present disclosure.

BRIEF DESCRIPTION OF THE DRAWINGS

The above-mentioned and other features, advantages, and aspects of embodiments of the present disclosure will become more apparent by referring to the following detailed description of the embodiments with reference to the accompanying drawings. Throughout the drawings, the same or similar reference signs refer to the same or similar elements. It should be understood that the drawings are schematic and that components and elements are not necessarily drawn to scale.

FIG. 1 is a schematic diagram of an information acquisition page;

FIG. 2 is a schematic diagram of an information acquisition page;

FIG. 3 is a schematic flowchart of an information acquisition method provided by the embodiments of the present disclosure;

FIG. 4 is a schematic diagram of an application program display page provided by the embodiments of the present disclosure;

FIG. 5a is a schematic diagram of an information acquisition page provided by the embodiments of the present disclosure;

FIG. 5b is a schematic diagram of an information acquisition page provided by the embodiments of the present disclosure;

FIG. 5c is a schematic diagram of an information acquisition page provided by the embodiments of the present disclosure;

FIG. 6 is a schematic diagram of an information acquisition method provided by the embodiments of the present disclosure;

FIG. 7 is a schematic structural diagram of an information acquisition device provided by the embodiments of the present disclosure;

DETAILED DESCRIPTION

Figure 8:
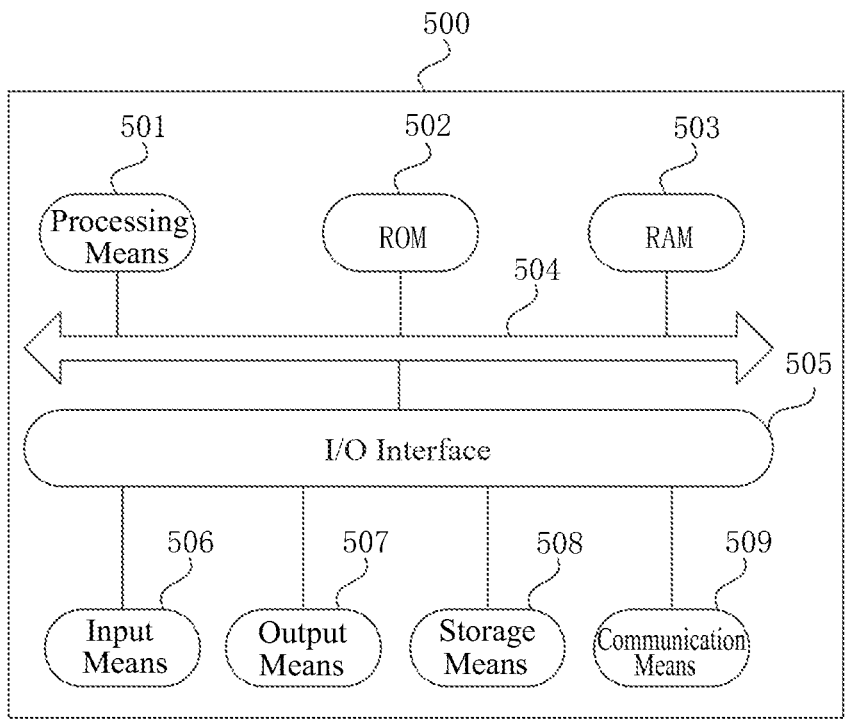
FIG. 8 is a schematic structural diagram of an electronic apparatus provided by the embodiments of the present disclosure.

Embodiments of the present disclosure will be described in more detail below with reference to the accompanying drawings. Although certain embodiments of the present disclosure are shown in the drawings, it should be understood that the present disclosure may be embodied in various forms and should not be construed as limited to the embodiments set forth herein, but rather these embodiments are provided for a more thorough and complete understanding of the present disclosure. It should be understood that the drawings and the embodiments of the present disclosure are for illustration purposes only and are not intended to limit the scope of the present disclosure.

It should be understood that the various steps recited in method embodiments of the present disclosure may be performed in a different sequences, and/or performed in parallel. Moreover, the method embodiments may include additional steps and/or omit performing the steps as shown. The scope of the present disclosure is not limited in this respect.

The term "comprising" and variations thereof as used herein is intended to be open-ended, i.e., "comprising, but not limited to". The term "based on" is "at least partially based on". The term "one embodiment" refers to "at least one embodiment"; the term "a further embodiment" refers to "at least one further embodiment"; the term "some embodiments" refers to "at least some embodiments". Relevant definitions for other terms will be given in the following description.

It should be noted that the wordings "first", "second", and the like as mentioned in the present disclosure are only used for distinguishing different devices, modules or units, and are not used for limiting the sequence of the functions performed by these devices, modules or units or interdependence thereof.

It should be noted that definitions of "one" or "a plurality of" as mentioned in the present disclosure are intended to be exemplary rather than limiting, which shall be construed by those skilled in the art as "one or a plurality of", unless the context clearly indicates otherwise.

The names of messages or information exchanged between a plurality of devices in the embodiments of the present disclosure are for illustrative purposes only, and are not intended to limit the scope of the messages or information.

It may be understood that, prior to the implementation of the technical solutions disclosed in the embodiments of the present disclosure, users shall be informed of the type, the range of use, the scenarios of use, etc. of personal information related to the present disclosure in a proper manner in accordance with relevant laws and regulations, and authorization of the users shall be obtained.

For example, in response to the receipt of a user's proactive request, prompt information is sent to the user to explicitly prompt the user that the requested operation to be performed would require acquisition and use of personal information of the user. Accordingly, the user can autonomously select whether to provide personal information to software or hardware, such as an electronic apparatus, an application program, a server or a storage medium that performs the operations of the technical solution of the present disclosure, according to the prompt information.

As an optional but non-limiting implementation manner, in response to the receipt of a user's proactive request, sending the prompt information to the user may take the form of, for example, a pop-up window, and the prompt information may be presented in a text manner in the pop-up window. In addition, a selection control for the user to choose to "agree" or "disagree" the presentation of personal information to the electronic apparatus can be further carried in the pop-up window.

It may be understood that the above process of notification and acquisition of a user's authorization is only illustrative and is not intended to limit the implementation manner of the present disclosure, and other manners satisfying the relevant laws and regulations may also be applied to the implementation of the present disclosure.

It may be understood that the data involved in the present disclosure, including but not limited to the data itself, the acquisition or use of the data, should comply with the requirements of the applicable laws and regulations and related rules.

For any application program, before a new user registers the application program and gets access to the application program, interest information of the new user can be collected, so as to facilitate accurate data push to the new user in the cold start phase as well as the subsequent running process of the application program.

However, the problem of inaccurate acquisition exists in the current interest information acquisition process.

According to the technical solution provided by the present embodiment, an information acquisition page is displayed through a detected preset trigger operation, selectable display information is displayed through the information acquisition page, and in the case where any display information is triggered, newly-added display information is determined and displayed on the basis of the selected display information, which facilitate selection of further interest information by a user based on the newly-added display information. Herein, for each trigger operation on the display information, the corresponding newly-added display information comprises the same-level display information and/or next-level display information, and by displaying more subdivided display information progressively, it is made easier for the user to know the relationship among the display information, thereby increasing the accuracy and fine granularity of selecting the interest information by the user.

The current process of acquiring the interest information may be displaying an information acquisition page and determining the interest information according to the selection operation of the user on the information acquisition page. For some application programs, the information acquisition page only includes theme tag information, as shown in FIG. 1, the theme tag information is widely ranged, which is unfavorable for the targeted acquisition of the interest information. For some application programs, the information acquisition page includes multiple pieces of topical data or selective data, as shown in FIG. 2, but since it cannot be determined whether the new user is interested in unfamiliar content, even the topical data or selective data, the efficiency and accuracy of the user's selection will be affected. In the information acquisition pages in FIG. 1 and FIG. 2, in response to a selection operation of the user on any theme tag information or topical data, the selected theme tag information or topical data is displayed in a differentiated manner. In response to the trigger operation of the selection ending control, such as "confirm", the interest information of the user is determined based on the selected theme tag information or topical data.

In view of the above technical problems, the embodiments of the present disclosure provides an information acquisition method, and referring to FIG. 3, which is a schematic flowchart of an information acquisition method according to the embodiments of the present disclosure, the embodiments of the present disclosure are applicable to the case of performing information acquisition on new users of an application program, where the method may be implemented by an information acquisition device which may be embodied in form of software and/or hardware, and optionally may be implemented by an electronic device which may be a mobile terminal, a PC terminal or a server, etc. As shown in FIG. 3, the method comprises:

S110, in response to a preset trigger operation, displaying an information acquisition page which comprises at least one level of display information.

S120, in response to a trigger operation on any one piece of the display information, displaying at least part of same-level display information corresponding to the selected display information, and/or displaying at least part of next-level display information of the selected display information, wherein the displayed display information of each level is selectable display information.

S130, in the case of detecting that a selection ending condition is satisfied, determining target acquisition information based on the selected display information of each level.

The application programs in this embodiment may be application programs for displaying media data, for example, including but not limited to a video APP, an audio APP, a music APP, a podcast APP, and the like, to which no definition is made herein. The acquisition of interest information can be performed herein for any type of media data, or for multiple types of media data.

Optionally, the application programs may be those with a podcast data playing function, and accordingly, the information acquisition method provided by the embodiments of the present disclosure may be used to acquire interest information related to podcast data.

In this embodiment, selectable display information is displayed through an information acquisition page and a selection operation of a user in the information acquisition page is detected, so as to acquire interest information of the user. Herein, the information acquisition page is displayed by responding to a preset trigger operation. In some embodiments, the preset trigger operation may be an initial trigger operation of the picture. For example, the preset trigger operation may be a start operation of the application program following a registration operation of the application program, or may be a restart operation of the application program after expiration of a preset time period since the last start operation of the application program. The preset trigger operation may also be a first trigger operation on a tag corresponding to a certain type of media data in the case where the application program includes a playing function of multiple types of media data, or a second trigger operation after expiration of a preset time period since the last trigger operation on the tag corresponding to the media data, etc. For any application program, in the case where the application program is started for the first time after registration, the registered user is regarded as a new user of the application program, and interest information of the new user may be acquired through displaying of an information acquisition page. In the case of expiration of a preset time period since the last start operation of the application program, it is indicated that the user has not logged in to the application program for a long time and it cannot be guaranteed whether the interest information of the user is changed or not, thus the user who has not logged in for a long time can be defined as a kind of "new user", whose interest information may be acquired through displaying of the information acquisition page, so that the acquired interest information is used as reference information for data push after the application program is started, wherein the preset time period can be a time length threshold that is set in advance, such as three months.

Tags corresponding to multiple types of media data can be provided in an application program, referring to FIG. 4, which is a schematic diagram of an application program display page provided by the embodiments of the present disclosure. There are two types of media data, namely music and podcasts, in FIG. 4, which is only an example. In other embodiments, there may be other types of media data, or other quantities of multiple pieces of media data. Meanwhile, the display positions of the tags of the above "Music", "Podcasts" and the like are only examples and can be set at any position of the display page depending on demands. Through the trigger operation on any tag, media data display content the type of which corresponds to the triggered tag is displayed on the corresponding display page, so as a user can select the media data to play through the display page conveniently. Here, the interest information corresponding to different types of media data is different, and the acquisition of interest information can be performed directed to different types of media data. In some embodiments, after the application program is started for the first time, in the case where the tag of any type of media data is triggered for the first time, an information acquisition page corresponding to the type of media data may be displayed to acquire interest information of the type of media data. Likewise, in the case where the tag of any type of media data are is not triggered after expiration of a preset time period, when the tag of this type of media data is triggered again, the user can be defined as a "new user", and the interest information of this type of media data is acquired again through the information acquisition page.

In some embodiments, the preset trigger operation may also be a selection operation on the display information during the information acquisition process, and accordingly, the displayed information acquisition page is a picture in the information acquisition process and may include selected display information and unselected display information.

In any of the above embodiments, display information is displayed in the information acquisition page, wherein the display information may be selectable interest information corresponding to the target type of media data, and taking the target type of media data being podcast data as an example, the information acquisition page is a podcast information acquisition page, and the display information is selectable interest information corresponding to the podcast data.

Optionally, the display information comprises one or more of theme tag information of media data and associated images of media data, and correspondingly, with respect to podcast data, the display information comprises one or more of theme tag information of podcast and associated images of podcast data. After the target type of media data is divided into themes according to the theme tag information, tag information corresponding to each theme and theme tag information of multiple levels may be preset. Illustratively, the top-level theme tag information of podcast data includes, but is not limited to, music, story, comedy, news, etc., wherein the next-level theme tag that the music tag may include includes, but is not limited to, classical, jazz, rock, etc.

Herein, the theme tag information of media data may include multiple levels of tag information, and there is an affiliated relationship between different levels of tag information. The theme tag information of each level respectively corresponds to the associated images of multiple pieces of media data. The associated images of the media data may be images associated with the media data, which include, but are not limited to, a cover image, a poster image, a image of an associated person (e.g., a singer image of music data, a character image in video data), and the like of the media data. Taking podcast data as an example, the associated images may be a cover page image, an author image, etc. of the podcast data, to which no definition is made herein. In this embodiment, multiple associated images corresponding to each level of the theme tag information may be stored in advance, so as to facilitate determination of the associated images to be displayed based on the corresponding relationship between the theme tag information and the associated images. It can be understood that, the associated images corresponding to any one piece of theme tag information respectively are associated images corresponding to topical data in the media data corresponding to this piece of theme tag information, wherein the topical data can be determined in accordance with the degree of concern on the media data, and meanwhile, the associated images corresponding to the theme tag information can be renewed periodically based on the changeability of the degree of concern on the media data.

The information acquisition page may include one level (e.g., the top level) of theme tag information, and as an example, reference is made to FIG. 1; the information acquisition page may also include multiple levels of tag information, and as an example, reference is made to FIG. 5a; the information acquisition page may further include at least one level of tag information and at least partially associated images that respectively correspond to each piece of tag information, and as an example, reference is made to FIG. 5b and FIG. 5c, wherein, in FIG. 5b, multiple pieces of same-level theme tag information are included, and multiple associated images that respectively correspond to each piece of theme tag information are displayed. In FIG. 5c, multiple pieces of same-level theme tag information are included, each piece of theme tag information includes, respectively, multiple pieces of next-level theme tag information and associated images that respectively correspond to each piece of next-level theme tag information, and the next-level theme tag information and the corresponding associated images are displayed in an associated manner.

It can be understood that the information acquisition page corresponding to FIG. 5a to FIG. 5c may be an initial information acquisition page, wherein sub-tags and/or associated images respectively corresponding to the theme tag 2 and the theme tag 3 are not shown herein. By displaying one or more of multiple pieces of tag information of at least one level and associated images, it is made easier for a user to know the theme classification of the media data in more detail to accurately select a theme of interest, thereby improving the accuracy of information acquisition. It can be understood that the information acquisition page corresponding to FIG. 5a to FIG. 5c may further be a picture during the information acquisition process, and illustratively, sub-tags and/or associated images corresponding to the theme tag 1 may be triggered and displayed through a selection operation on the theme tag 1.

Any piece of display information in the information acquisition page in any of the above forms is selectable display information, which can be triggered by a user through a selection operation and newly-added display information is triggered to renew the above information acquisition page. The user can trigger any display information through a click operation, and in response to the trigger operation of the display information, the same-level display information and/or the next-level display information are displayed.

Herein, the selected display information may be theme tag information, or may also be associated image, or may also be theme tag information and associated image that are displayed in an associated manner; illustratively, sub-tags in FIG. 5a and associated images in FIG. 5b may be selected separately, and sub-tags and associated images in FIG. 5c are displayed in an associated manner, and correspondingly, the sub-tag and the associated image that are associated may be selected synchronously, thereby realizing the selection of two kinds of display information by one click. Accordingly, the same-level display information and/or the next-level display information is determined based on the selected theme tag information and/or associated image. It can be understood that, in a case where there is same-level candidate display information in the selected display information, the same-level display information to be displayed is determined from the same-level candidate display information.

Optionally, the same-level display information comprises one or more of the following: associated images, which belong to same-level theme tag information as the selected display information; associated images of first media data with the same associated information as the media data corresponding to associated images in the selected display information; other associated images, which satisfy the image characteristic similarity condition with the associated images in the selected display information; associated images of second media data, which satisfy the data characteristic similarity condition with the media data corresponding to the associated images in the selected display information.

In the case where theme tag information is included in the selected display information, the associated images to be displayed are determined to serve as the same-level display information based on the same-level preferred associated images corresponding to the theme tag information. Herein, the same-level preferred associated images are associated images which are not displayed and correspond to the theme tag information, and a preset number of the same-level preferred associated images can be randomly screened to serve as displayed associated images; alternatively, the media data corresponding to the same-level preferred associated images may be sequenced based on the degree of concern, and a preset number of same-level preferred associated images are determined to serve as the displayed associated images based on the sequencing, for example, the preset number of preferred same-level associated images with the highest degree of concern are taken as the displayed associated images.

In the case where associated images are included in the selected display information, the theme tag information corresponding to the associated images are determined, and the same-level display information, namely the associated image of the same-level theme tag information, is determined based on the theme tag information, for which reference is made to the above manner and which is no longer described herein.

In the case where associated images are included in the selected display information, media data corresponding to the associated images is determined, and associated information of the media data is determined, wherein the associated information includes, but is not limited to, associated figures of the media data, which may be performers, producers, and the like of the media data, such as singers of music data, directors and performers of video data, and sound authors of podcast data, and the like. Candidate media data with the same associated information as the above media data is determined, and first media data is determined in the above candidate media data, wherein the first media data can be at least part of candidate media data. The associated image of the first media data is determined as the same-level display information.

In the case where associated images are included in the selected display information, same-level candidate associated images corresponding to the associated image are determined, and the same-level candidate associated images may include, but are not limited to, undisplayed associated images belonging to the same theme tag information as the selected associated images, or undisplayed associated images having the same associated information as the selected associated images, etc. Whether the same-level candidate associated image satisfies the image characteristic similarity condition with the selected associated image is determined, and if so, the same-level candidate associated image that satisfies the image characteristic similarity condition are determined as the associated image to be displayed. Herein, the way of judging the image characteristic similarity condition may be to determine the image similarity between the same-level candidate associated image and the selected associated image, and to perform judgment based on a preset similarity threshold to obtain a judgment result. Alternatively, the way of judging the image characteristic similarity condition may also be to perform clustering of the same-level candidate associated images with the selected associated images and to determine the same-level candidate associated images belonging to the same class as the selected associated images as satisfying the image characteristic similarity condition. It should be noted that, during the process of determining the image characteristic similarity condition on the images, the same-level candidate associated images and the selected associated images are respectively converted into image vectors.

Among the same-level candidate associated images that satisfy the image characteristic similarity condition, at least part of the same-level candidate associated images are determined as the associated images to be displayed, namely other associated images that satisfy the image characteristic similarity condition.

In the case where associated images are included in the selected display information, media data corresponding to the associated images in the selected display information (namely the selected associated images) is determined, and second media data that satisfies the data characteristic similarity condition with the media data corresponding to the selected associated images is determined among the candidate media data. Herein, the candidate media data may be other media data having the same theme tag information as the media data corresponding to the selected associated image, or may also be media data corresponding to the undisplayed associated images. Whether the candidate media data satisfies the data characteristic similarity condition with the media data corresponding to the selected associated image is determined, and the candidate media data that satisfies the data characteristic similarity condition is determined as second media data. The associated image corresponding to at least part of the second media data is determined as the associated image to be displayed. Herein, the way of judging the data characteristic similarity condition is no longer described at this point.

On the basis of the above embodiments, in the case where there is next-level candidate display information in the selected display information, the next-level display information to be displayed is determined among the next-level candidate display information. Optionally, displaying at least part of display information of the next level of the selected display information comprises: with respect to the theme tag information included in the selected display information, determining the next-level theme tag information corresponding to the theme tag information as next-level display information; and/or taking partially associated images included in the theme tag information as the next-level display information.

In the case where theme tag information is included in the selected display information, whether the theme tag information includes the next-level theme tag information is determined, and if so, the next-level theme tag information is determined as the next-level display information based on the affiliated relationship among the theme tag information. Illustratively, referring to FIG. 5a, sub-tag 1, sub-tag 2, and sub-tag 3 in FIG. 5a may be the next-level display information to be displayed in the case where the theme tag 1 is triggered.

With respect to the theme tag information included in the selected display information and the corresponding relationship between the theme tag information and the associated images, associated information can serve as the next-level display information corresponding to the theme tag information, and correspondingly, the partially associated image corresponding to the theme tag information may serve as the next-level display information. Here, the screening manner of the partially associated image may be determination based on the degree of concern on the media data corresponding to the associated image, or random determination, to which no definition is made herein. Illustratively, referring to FIG. 5b, associated image 1, associated image 2 and associated image 3 in FIG. 5b may be the next-level display information to be displayed in the case where the theme tag 1 is triggered.

It can be understood that the degree of concern on the media data may be determined based on the number of times when the media data is played, forwarded and made favorite, etc.

Optionally, the next-level theme tag information corresponding to the theme tag information and at least one associated images respectively corresponding to the respective next-level theme tag information are determined, and the next-level theme tag information and the corresponding at least one associated images are taken as next-level display information for associated display. Illustratively, referring to FIG. 5c, there is a corresponding relationship between associated image 1 and sub-tag 1 in FIG. 5c, that is, the associated image 1 is included in the associated images corresponding to the sub-tag 1.

On the basis of the above embodiments, in the case where there is next-level candidate display information and same-level candidate display information simultaneously in the selected display information, the next-level display information and the same-level display information are determined simultaneously for synchronous display.

In accordance with the determined same-level display information and/or next-level display information, the information acquisition page is renewed, so as to form a new information acquisition page for display, wherein each piece of display information in the new information acquisition page can be further selected, and correspondingly, the new information acquisition page continues to be renewed corresponding to the trigger operation on the display information in the new information acquisition page, and the process goes on in a similar manner until the information acquisition process is finished, thereby obtaining the target acquisition information.

In response to a trigger operation on any one piece of the display information, newly-added display information corresponding to the tripper operation, namely the same-level display information and/or next-level display information, is determined, the display area corresponding to the selected display information is determined, and at least part of the same-level display information and/or at least part of the next-level display information is displayed in the display area.

Optionally, the display area is located between the selected display information and the adjacent display information on a preset side of the selected display information; wherein, the preset side of the selected display information may be preset, and may be the upper side, the lower side, the left side or the right side of the selected display information. By displaying the newly-added display information in the above display area, it is made easier for the user to perform a selection operation again.

Illustratively, referring to FIG. 6, which is a schematic diagram of an information acquisition method provided by the embodiments of the present disclosure, the selected display information in the left figure in FIG. 6 may be "theme tag 1", and correspondingly, a display area is provided between the "theme tag 1" and the "theme tag 2" on the lower side of the "theme tag 1" for displaying the display information such as the sub-tag and/or associated image corresponding to the "theme tag 1", thereby forming the middle figure of FIG. 6. The associated image 1 in the middle figure of FIG. 6 is triggered, and correspondingly, a display area is formed between the associated image 1 and the associated image 2 on the right side of the associated image 1 for displaying the associated image 11 and the associated image 12 corresponding to the associated image 1, thereby forming the right figure of FIG. 6.

On the basis of the above embodiments, the display positions of the other display information located on the preset side of the selected display information are re-determined according to the size of the display area, and the other display information is displayed based on the re-determined display positions. Herein, the size of the display area may be preset, or may be determined according to the amount and size of the newly-added display information. Illustratively, the size of the display area corresponding to the middle figure in FIG. 6 may be preset, and the display area corresponding to the association image 11 and the association image 12 in the right figure in FIG. 6 may be determined according to the number and the size of the association image 11 and the association image 12.

Other display information subjected to position adjustment is determined by the position where the display area is located, wherein the other display information is the display information located on a preset side of the selected display information, such as the "theme tag 2" and the "theme tag 3" located on the lower side of the "theme tag 1", and the associated image 2 and the associated image 3 located on the right side of the associated image 1. According to the size of the display area, the adjusted display position of the other display information subjected to position adjustment is determined, and a display is performed. For example, the adjusted display position of the other display information may be determined according to the size of the display area in the direction of the preset side. For example, the height of the display area in the middle figure of FIG. 6 is h, and accordingly, the position adjustment value of the other display information in the direction of the preset side may be the height value h. In the right figure of FIG. 6, the width of the display area is M, and the position adjustment value of the other display information in the direction of the preset side may be the width value M.

By adaptively adjusting the display positions of other display information in the information acquisition page, a new information acquisition page is formed.

On the basis of the above embodiments, the size of the display area is limited, which cannot satisfy the display of a large amount of display information, so that part of the display information in the display area is hidden. Illustratively, the associated image 3 in the right figure of FIG. 6 is hidden, and the display information in the display area can be renewed by a renewing operation to display the hidden display information. Optionally, in response to a renewing operation on the display information in the display area, the display information in the display area is renewed. This renewing operation may be a swipe operation in the display area or a trigger operation on a renewing control in the display area.

The hidden display information is displayed through a renewing operation, so as to facilitate the display of display information in the case where there is a lot of display information.

On the basis of the above embodiments, any piece of unselected display information in a new information acquisition page is selectable display information, which can be triggered by a user through a click operation or the like, new display information is further displayed to renew the information acquisition page, thereby realizing a progressive display of information, and the associated relationship between the newly-added display information and the selected display information can serve as a reference for the selection of a user, which is of help for the user to understand each piece of display information.

The above selection operation is circularly performed until it is detected that a selection ending condition is satisfied, the information acquisition process is ended, and the target acquisition information is obtained. Herein, the selection ending condition comprises one or more of the following: a preset ending control is triggered; the number of pieces of the selected display information reaches a preset value; and the display of all preset selectable display information is completed. Herein, the preset ending control may be a control such as "confirm" or the like. In response to a trigger operation of the ending control, a jump occurs from the information acquisition page to a display picture of the application program, a cold start is performed during the jumping process, and the media data information is displayed in the display picture of the application program. The preset value corresponding to the number of pieces of the selected display information may be set in advance, to which no definition is made herein. In this embodiment, a display information library is preset, which includes a plurality of pieces of selectable display information, and in the case where the display of all preset selectable display information in the display information library is completed, new addition of display information is no longer supported, that is, the selection process is ended.

Determination of target acquisition information in accordance with the selected display information can be achieved by one or more of the following means: taking the theme tag information in the selected display information, the theme tag information corresponding to the associated image, and the associated information of the media data corresponding to the associated image as target acquisition information. The selected display information is converted into a feature vector, and the feature vector is input into an interest extraction model to obtain target acquisition information output by the interest extraction model.

It should be noted that a "skip" control may be provided in the information acquisition page, and in response to the trigger operation of the "skip" control, a jump may occur from the page acquisition page to a display picture of the application program, without performing information acquisition.

According to the technical solution provided by the present embodiment, an information acquisition page is displayed through a detected preset trigger operation, selectable display information is displayed through the information acquisition page, and in the case where any display information is triggered, newly-added display information is determined and displayed on the basis of the selected display information, which facilitate selection of further interest information by a user based on the newly-added display information. Herein, for each trigger operation on the display information, the corresponding newly-added display information comprises the same-level display information and/or next-level display information, and by displaying more subdivided display information progressively, it is made easier for the user to know the relationship among the display information, thereby increasing the accuracy and fine granularity of selecting the interest information by the user.

On the basis of the above embodiments, the embodiments of the present disclosure further provide a preferred embodiment of the information acquisition method. Illustratively, referring to FIG. 6, according to the preset trigger operation, an information acquisition page is displayed for acquiring interest information on podcast data, such as the left figure. The information acquisition page includes therein first-level display information, namely the top-level theme tag information. The top-level theme tag information here includes, but is not limited to, tag information of music, sports, news, comedy, etc., which is used for determination of tag information of interest by a user through displaying tag information familiar to the user. In the case where any piece of theme tag information is triggered, next-level display information corresponding to the theme tag information is displayed, for example, next-level theme tag information and corresponding associated image, namely the sub-tag in the middle figure and the corresponding associated image, and the above next-level theme tag information and corresponding associated image are displayed in an associated manner, thereby forming the middle figure of FIG. 6. In response to a trigger operation on any one of the associated images, one or more of other associated image belonging to the same sub-tag as the selected associated image, other associated image having the same associated information as the selected associated image, other associated image satisfying an image characteristic similarity condition with the selected associated image, other associated image satisfying a data characteristic similarity condition with media data corresponding to the selected associated image etc. is/are determined and displayed between the associated image 1 and the associated image 2 as the same-level display information.

The above selection operation is circularly performed until it is detected that the user clicks a confirm control to complete the information acquisition process, and the target acquisition information is obtained.

FIG. 7 is a schematic structural diagram of an information acquisition device provided by the embodiments of the present disclosure, and as shown in FIG. 7, the device comprises an information acquisition page display module 210, a display information display module 220 and an information determination module 230.

The information acquisition page display module 210 is configured to, in response to a preset trigger operation, display an information acquisition page which comprises at least one level of display information;

the display information display module 220 is configured to, in response to a trigger operation on any one piece of the display information, display at least part of same-level display information corresponding to the selected display information, and/or displaying at least part of next-level display information of the selected display information, wherein the displayed display information of each level is selectable display information;

the information determination module 230 is configured to, in the case of detecting that a selection ending condition is satisfied, determine target acquisition information based on the selected display information of each level.

According to the technical solution provided by the embodiments of the present disclosure, an information acquisition page is displayed through a detected preset trigger operation, selectable display information is displayed through the information acquisition page, and in the case where any display information is triggered, newly-added display information is determined and displayed on the basis of the selected display information, which facilitate selection of further interest information by a user based on the newly-added display information. Herein, for each trigger operation on the display information, the corresponding newly-added display information comprises the same-level display information and/or next-level display information, and by displaying more subdivided display information progressively, it is made easier for the user to know the relationship among the display information, thereby increasing the accuracy and fine granularity of selecting the interest information by the user.

On the basis of the above embodiments, optionally, the display information comprises one or more of the following: theme tag information of media data and associated images of media data, wherein the theme tag information of media data includes multiple levels of theme tag information, and the theme tag information of each level respectively corresponds to the associated images of multiple pieces of media data.

On the basis of the above embodiments, optionally, the same-level display information comprises one or more of the following:

associated images, which belong to same-level theme tag information as the selected display information;

associated images of first media data with the same associated information as the media data corresponding to associated images in the selected display information;

other associated images, which satisfy the image characteristic similarity condition with the associated images in the selected display information; associated images of second media data, which satisfy the data characteristic similarity condition with the media data corresponding to the associated images in the selected display information.

On the basis of the above embodiments, optionally, the display information display module 220 is configured to:

with respect to the theme tag information included in the selected display information, determining the next-level theme tag information corresponding to the theme tag information as next-level display information; and/ or taking partially associated images included in the theme tag information as the next-level display information.

Optionally, the display information display module 220 is configured to:

determining the next-level theme tag information corresponding to the theme tag information and at least one associated images respectively corresponding to the respective next-level theme tag information, and taking the next-level theme tag information and the corresponding at least one associated images as the next-level display information for associated display.

On the basis of the above embodiments, optionally, the display information display module 220 is configured to:

determine the display area corresponding to the selected display information, and display at least part of the same-level display information and/or at least part of the next-level display information in the display area.

Optionally, the display area is located between the selected display information and the adjacent display information on a preset side of the selected display information;

the display information display module 220 is further configured to:

re-determining the display positions of the other display information located on the preset side of the selected display information according to the size of the display area, and displaying the other display information based on the re-determined display positions.

Based on the above embodiments, optionally, the device further comprises:

a display information renewing module configured to, in response to a renewing operation on the display information in the display area, renew the display information in the display area.

Based on the above embodiments, optionally, the selection ending condition comprises one or more of the following: a preset ending control is triggered; the number of pieces of the selected display information reaches a preset value; and the display of all preset selectable display information is completed.

On the basis of the above embodiments, optionally, the information acquisition page is a podcast information acquisition page, and the display information includes one or more of podcast theme tag information and associated images of podcast data.

The information acquisition device provided by the embodiments of the present disclosure can implement the information acquisition method provided by any embodiment of the present disclosure and possesses corresponding functional modules for implementing the method with beneficial effects.

It should be noted that, the units and modules included in the above device are divided merely depending on functional logic, but are not limited to the above division, as long as the corresponding functions can be implemented; in addition, specific names of the functional units are also used only for distinguishing one functional unit from another, and are not used for limiting the protection scope of the embodiments of the present disclosure.

FIG. 8 is a schematic structural diagram of an electronic apparatus provided by the embodiments of the present disclosure. Referring now to FIG. 8, it shows a schematic structural diagram of an electronic apparatus (e.g., terminal device or server in FIG. 8) 500 suitable for implementing embodiments of the present disclosure. The terminal devices in the embodiment of the present disclosure may include, but are not limited to, mobile terminals, such as mobile phones, laptops, digital broadcast receivers, PDAs (personal digital assistants), PADs (tablet computers), PMPs (portable multimedia players), on-board terminals (e.g., on-board navigation terminals), and the like, as well as fixed terminals, such as digital TVs, desktop computers, and the like. The electronic apparatus as shown in FIG. 8 is only an example, and should not bring any limitation to the functions and the scope of use of the embodiments of the present disclosure.

As shown in FIG. 8, the electronic apparatus 500 may include a processing means (e.g., central processing unit, graphics processor, etc.) 501 which may perform various appropriate actions and processes in accordance with a program stored in a Read Only Memory (ROM) 502 or a program loaded from a storage means 508 into a Random Access Memory (RAM) 503. In the RAM 503, various programs and data necessary for the operation of the electronic apparatus 500 are further stored. The processing means 501, the ROM 502, and the RAM 503 are connected to each other through a bus 504. An editing/output (I/O) interface 505 is also connected to the bus 504.

Usually, the following means may be connected to the I/O interface 505: input means 506 including, for example, a touch screen, a touch pad, a keyboard, a mouse, a camera, a microphone, an accelerometer, a gyroscope, etc.; output means 507 including, for example, a Liquid Crystal Display (LCD), a speaker, a vibrator, etc.; storage means 508 including, for example, a magnetic tape, a hard disk, etc.; and communication means 509. The communication means 509 may allow wireless or wired communication of the electronic apparatus 500 with other devices for data exchange. Although FIG. 8 illustrates an electronic apparatus 500 having various means, it shall be understood that it is not compulsory to implement or possess all of the illustrated means. More or fewer means may be alternatively implemented or possessed.

In particular, the processes described above with reference to the flowchart may be implemented as a computer software program, according to the embodiments of the present disclosure. For example, embodiments of the present disclosure include a computer program product comprising a computer program carried on a non-transitory computer-readable medium, the computer program containing program code for performing the method illustrated by the flowchart. In such an embodiment, the computer program may be downloaded and installed from a network via the communication means 509, or installed from the storage means 508, or installed from the ROM 502. The computer program, when executed by the processing means 501, performs the above functions defined in the method of the embodiments of the present disclosure.

The names of messages or information exchanged between a plurality of devices in the embodiments of the present disclosure are for illustrative purposes only, and are not intended to limit the scope of the messages or information.

The electronic apparatus provided by the embodiments of the present disclosure and the information acquisition method provided by the above embodiments belong to the same inventive concept, and technical details that are not described in detail in the present embodiment can be referred to the above embodiments, and the present embodiment and the above embodiments have the same beneficial effects.

The embodiments of the present disclosure provide a computer storage medium having a computer program stored thereon, the program, when executed by a processor, implementing the information acquisition method provided by the above embodiments.

It should be noted that the computer-readable medium of the present disclosure may be a computer-readable signal medium or a computer-readable storage medium or any combination of the two. A computer-readable storage medium may be, for example, but is not limited to, an electronic, magnetic, optical, electromagnetic, infrared, or semiconductor system, device, or means, or any combination of the foregoing. More specific examples of the computer-readable storage medium may include, but are not limited to, an electrical connection having one or more wires, a portable computer diskette, a hard disk, a Random Access Memory (RAM), a Read-Only memory (ROM), an erasable programmable read-only memory (EPROM or flash memory), an optical fiber, a portable compact disc read-only memory (CD-ROM), an optical storage means, a magnetic storage means, or any suitable combination of the foregoing. In the present disclosure, the computer-readable storage medium may be any tangible medium that contains or stores a program for use by or in combination with an instruction execution system, device, or means. Besides, in the present disclosure, the computer-readable signal medium may include a data signal with computer-readable program code embodied therein, which is propagated in baseband or as part of a carrier wave. Such a propagated data signal may take a variety of forms, including, but not limited to, electro-magnetic signal, optical signal, or any suitable combination thereof. The computer-readable signal medium may further be any computer-readable medium that is not a computer-readable storage medium and that can communicate, propagate, or transmit a program for use by or in combination with an instruction execution system, device, or means. Program code embodied on a computer-readable medium may be transmitted with any appropriate medium, including, but not limited to, electrical wires, optical cables, RF (radio frequency), etc., or any suitable combination thereof.

In some embodiments, clients and servers may communicate by means of any currently known or future developed network Protocol, such as HTTP (HyperText Transfer Protocol), and may be interconnected with digital data communication (e.g., a communication network) in any form or medium. Examples of communication network include a Local Area Network ("LAN"), a Wide Area Network ("WAN"), an interconnection network (e.g., the Internet), and an end-to-end network (e.g., ad hoc end-to-end network), as well as any currently known or future developed network.

The computer-readable medium may be contained in the electronic apparatus, or may stand alone and not be assembled into such electronic apparatus.

The computer-readable medium carries one or more programs which, when executed by the electronic apparatus, enable(s) the electronic apparatus: to:

in response to a preset trigger operation, display an information acquisition page which comprises at least one level of display information; in response to a trigger operation on any one piece of the display information, display at least part of same-level display information corresponding to the selected display information, and/or display at least part of next-level display information of the selected display information, wherein the displayed display information of each level is selectable display information; in the case of detecting that a selection ending condition is satisfied, determine target acquisition information based on the selected display information of each level.

Computer program code for carrying out operations of the present disclosure may be written in any one or more programming languages or combination thereof, the programming languages including, but not limited to, object-oriented programming languages, such as Java, Smalltalk, C++, and also including conventional procedural programming languages, such as the "C" language or similar programming languages. The program code may be executed entirely on a user's computer, partly on a user's computer, as a stand-alone software package, partly on a user's computer and partly on a remote computer, or entirely on a remote computer or server. In the cases where a remote computer is involved, the remote computer may be connected to the user's computer through any type of network, including a Local Area Network (LAN) or a Wide Area Network (WAN), or may be made to an external computer (for example, through the Internet using an Internet service provider).

The flowchart and block diagrams in the accompanying drawings illustrate the architecture, functionality, and operation of possible implementations of systems, methods and computer program products according to various embodiments of the present disclosure. In this regard, each block in the flowchart or block diagrams may represent a module, program segment, or a part of code, which comprises one or more executable instructions for implementing the specified logical function(s). It should also be noted that, in some alternative implementations, the functions noted in the block may occur in an order different from what is noted in the drawings. For example, two blocks shown in succession may, in fact, be executed substantially concurrently, or the blocks may sometimes be executed in the reverse order, depending on the function involved. It is further to be noted that each block of the block diagrams and/or flowchart and combinations of blocks in the block diagrams and/or flowchart can be implemented by special hardware-based systems that perform specified functions or operations, or can be implemented by combinations of special hardware and computer instructions.

The concerned units as described in the embodiments of the present disclosure may be implemented by software or hardware. The name of a unit does not constitute a definition to the unit itself in some cases, for example, a first acquisition unit may also be described as a "unit that acquires at least two Internet protocol addresses".

The functions described herein above may be implemented, at least in part, by one or more hardware logic components. As a nonrestrictive example, exemplary types of hardware logic components that may be used include field Programmable Gate Arrays (FPGAs), Application Specific Integrated Circuits (ASICs), Application Specific Standard Products (ASSPs), system on a chip (SOCs), Complex Programmable Logic Devices (CPLDs), and the like.

In the context of the present disclosure, a machine-readable medium may be a tangible medium that can contain or store a program for use by or in combination with an instruction execution system, means, or device. The machine-readable medium may be a machine-readable signal medium or a machine-readable storage medium. The machine-readable medium may include, but is not limited to, an electronic, magnetic, optical, electromagnetic, infrared, or semiconductor system, means, or device, or any suitable combination of the foregoing. More specific examples of a machine-readable storage medium would include an electrical connection based on one or more wires, a portable computer diskette, a hard disk, a Random Access Memory (RAM), a Read-Only Memory (ROM), an erasable programmable read-only memory (EPROM or flash memory), an optical fiber, a portable compact disc read-only memory (CD-ROM), an optical storage device, a magnetic storage device, or any suitable combination of the foregoing.

[At the conclusion of this detailed description, all that is intended to be protected in form of the claims may be repeated as follows:]

According to one or more embodiments of the present disclosure, [Example One] provides an information acquisition method, comprising:

in response to a preset trigger operation, displaying an information acquisition page which comprises at least one level of display information; in response to a trigger operation on any one piece of the display information, displaying at least part of same-level display information corresponding to the selected display information, and/or displaying at least part of next-level display information of the selected display information, wherein the displayed display information of each level is selectable display information; in the case of detecting that a selection ending condition is satisfied, determining target acquisition information based on the selected display information of each level.

According to one or more embodiments of the present disclosure, [Example Two] provides an information acquisition method according to Example One, further comprising:

the display information comprises one or more of the following: theme tag information of media data and associated images of media data, wherein the theme tag information of media data includes multiple levels of theme tag information, and the theme tag information of each level respectively corresponds to the associated images of multiple pieces of media data.

According to one or more embodiments of the present disclosure, [Example Three] provides an information acquisition method according to Example One, further comprising:

the same-level display information comprises one or more of the following: associated images, which belong to same-level theme tag information as the selected display information; associated images of first media data with the same associated information as the media data corresponding to associated images in the selected display information; other associated images, which satisfy the image characteristic similarity condition with the associated images in the selected display information; associated images of second media data, which satisfy the data characteristic similarity condition with the media data corresponding to the associated images in the selected display information.

According to one or more embodiments of the present disclosure, [Example Four] provides an information acquisition method according to Example One, further comprising:

the displaying at least part of display information of the next level of the selected display information comprises: with respect to the theme tag information included in the selected display information, determining the next-level theme tag information corresponding to the theme tag information as next-level display information; and/or taking partially associated images included in the theme tag information as the next-level display information.

According to one or more embodiments of the present disclosure, [Example Five] provides an information acquisition method according to Example One, further comprising:

the determining the next-level theme tag information corresponding to the theme tag information as next-level display information; and/or taking partially associated images included in the theme tag information as the next-level display information comprises: determining the next-level theme tag information corresponding to the theme tag information and at least one associated images respectively corresponding to the respective next-level theme tag information, and taking the next-level theme tag information and the corresponding at least one associated images as the next-level display information for associated display.

According to one or more embodiments of the present disclosure, [Example Six] provides an information acquisition method according to Example One, further comprising:

the displaying at least part of same-level display information corresponding to the selected display information, and/or displaying at least part of next-level display information of the selected display information comprises: determining the display area corresponding to the selected display information, and displaying at least part of the same-level display information and/or at least part of the next-level display information in the display area.

According to one or more embodiments of the present disclosure, [Example Seven] provides an information acquisition method according to Example One, further comprising:

the display area is located between the selected display information and the adjacent display information on a preset side of the selected display information;

the method further comprises: re-determining the display positions of the other display information located on the preset side of the selected display information according to the size of the display area, and displaying the other display information based on the re-determined display positions.

According to one or more embodiments of the present disclosure, [Example Eight] provides an information acquisition method according to Example One, further comprising:

the method further comprises: in response to a renewing operation on the display information in the display area, renewing the display information in the display area.

According to one or more embodiments of the present disclosure, [Example Nine] provides an information acquisition method according to Example One, further comprising:

the selection ending condition comprises one or more of the following: a preset ending control is triggered; the number of pieces of the selected display information reaches a preset value; and the display of all preset selectable display information is completed.

According to one or more embodiments of the present disclosure, [Example Ten] provides an information acquisition method according to Example One, further comprising:

the information acquisition page is a podcast information acquisition page, and the display information includes one or more of podcast theme tag information and associated images of podcast data.

According to one or more embodiments of the present disclosure, [Example Eleven] provides an information acquisition device according to Example Eleven, comprising:

an information acquisition page display module configured to, in response to a preset trigger operation, display an information acquisition page which comprises at least one level of display information;

a display information display module configured to, in response to a trigger operation on any one piece of the display information, display at least part of the same-level display information corresponding to the selected display information, and/or display at least part of the next-level display information of the selected display information, wherein the displayed display information of each level is selectable display information; and an information determination module configured to, in the case of detecting that a selection ending condition is satisfied, determine target acquisition information based on the selected display information of each level.

The above description is only illustrative of the preferred embodiments of the present disclosure and the technical principles that are employed. It shall be understood by those skilled in the art that the scope of the present disclosure herein is not limited to the technical solutions formed by particular combination of technical features described above, but shall also encompass other technical solutions formed by any combination of technical features described above or equivalents thereof without departing from the spirit of the present disclosure, such as the technical solutions formed by interchange of the above features with the technical features disclosed in the present disclosure (yet not limited thereto) having similar functions.

Furthermore, although the operations are depicted in a particular order, this should not be construed as demanding that these operations be performed in the particular order as shown or in sequential order. Under certain circumstances, multitasking and parallel processing may be advantageous. Likewise, although several specific implementation details are included in the above description, these should not be construed as limitations on the scope of the present disclosure. Certain features that are described in the context of individual embodiments can also be implemented in a combined manner in a single embodiment. Conversely, various features that are described in the context of a single embodiment can also be implemented in multiple embodiments individually or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms for implementing the claims.

What is claimed is:

1. An information acquisition method, comprising:

in response to a preset trigger operation, displaying an information acquisition page which comprises at least one level of display information;

in response to a trigger operation on any one piece of the display information, performing at least one of: displaying at least part of same-level display information corresponding to the selected display information, or displaying at least part of next-level display information of the selected display information, wherein the displayed display information of each level is selectable display information;

in the case of detecting that a selection ending condition is satisfied, determining target acquisition information based on the selected display information of each level, wherein the display information comprises associated images of media data and associated images of second media data, which satisfy the data characteristic similarity condition with the media data corresponding to the associated images in the selected display information.

2. The method according to claim 1, wherein the display information further comprises theme tag information of media data.

3. The method according to claim 2, wherein the same-level display information comprises one or more of the following:

associated images, which belong to same-level theme tag information as the selected display information;

associated images of first media data with the same associated information as the media data corresponding to associated images in the selected display information;

other associated images, which satisfy the image characteristic similarity condition with the associated images in the selected display information.

4. The method according to claim 2, wherein the displaying at least part of next-level display information of the selected display information comprises at least one of:

with respect to the theme tag information included in the selected display information, determining the next-level theme tag information corresponding to the theme tag information as next-level display information; or taking partially associated images included in the theme tag information as the next-level display information.

5. The method according to claim 4, wherein at least one of the determining the next-level theme tag information corresponding to the theme tag information as next-level display information; or taking partially associated images included in the theme tag information as the next-level display information comprises:

determining the next-level theme tag information corresponding to the theme tag information and at least one associated images respectively corresponding to the respective next-level theme tag information, and taking the next-level theme tag information and the corresponding at least one associated images as the next-level display information for associated display.

6. The method according to claim 1, wherein performing at least one of: displaying at least part of same-level display information corresponding to the selected display information, or displaying at least part of next-level display information of the selected display information comprises:

determining the display area corresponding to the selected display information, and displaying in the display area at least one of at least part of display information of the same level or at least part of display information of the next level.

7. The method according to claim 6, wherein the tag information in the second display layer is located between the selected display information and the adjacent display information on a preset side of the selected display information;

the method further comprises:

re-determining the display positions of the other display information located on the preset side of the selected display information according to the size of the display area, and displaying the other display information based on the re-determined display positions.

8. The method according to claim 6, wherein the method further comprises:

in response to a renewing operation on the display information in the display area, renewing the display information in the display area.

9. The method according to claim 1, wherein the selection ending condition comprises one or more of the following:

a preset ending control is triggered;

the number of pieces of the selected display information reaches a preset value; and the display of all preset selectable display information is completed.

10. The method according to claim 1, wherein the information acquisition page is a podcast information acquisition page, and the display information includes one or more of podcast theme tag information and associated images of podcast data.

11. An electronic apparatus, comprising:

one or more processors;

a storage means to store one or more programs which, when executed by the one or more processors, enable(s) the one or more processors to implement an information acquisition method, comprising:

in response to a preset trigger operation, displaying an information acquisition page which comprises at least one level of display information;

in response to a trigger operation on any one piece of the display information, performing at least one of: displaying at least part of same-level display information corresponding to the selected display information, or displaying at least part of next-level display information of the selected display information, wherein the displayed display information of each level is selectable display information;

in the case of detecting that a selection ending condition is satisfied, determining target acquisition information based on the selected display information of each level, wherein the display information comprises associated images of media data and associated images of second media data, which satisfy the data characteristic similarity condition with the media data corresponding to the associated images in the selected display information.

12. The electronic apparatus according to claim 11, wherein the display information further comprises: theme tag information of media data.

13. The electronic apparatus according to claim 12, wherein the same-level display information comprises one or more of the following:

associated images, which belong to same-level theme tag information as the selected display information;

associated images of first media data with the same associated information as the media data corresponding to associated images in the selected display information;

other associated images, which satisfy the image characteristic similarity condition with the associated images in the selected display information.

14. The electronic apparatus according to claim 12, wherein the displaying at least part of next-level display information of the selected display information comprises at least one of:

with respect to the theme tag information included in the selected display information, determining the next-level theme tag information corresponding to the theme tag information as next-level display information; or taking partially associated images included in the theme tag information as the next-level display information.

15. The electronic apparatus according to claim 14, wherein at least one of the determining the next-level theme tag information corresponding to the theme tag information as next-level display information; or taking partially associated images included in the theme tag information as the next-level display information comprises:

determining the next-level theme tag information corresponding to the theme tag information and at least one associated images respectively corresponding to the respective next-level theme tag information, and taking the next-level theme tag information and the corresponding at least one associated images as the next-level display information for associated display.

16. A non-transitory storage medium containing computer-executable instructions which, when executed by a computer processor, are configured to implement an information acquisition method, comprising:

in response to a preset trigger operation, displaying an information acquisition page which comprises at least one level of display information;

in response to a trigger operation on any one piece of the display information, performing at least one of: displaying at least part of same-level display information corresponding to the selected display information, or displaying at least part of next-level display information of the selected display information, wherein the displayed display information of each level is selectable display information;

in the case of detecting that a selection ending condition is satisfied, determining target acquisition information based on the selected display information of each level, wherein the display information comprises associated images of media data, associated images of second media data, which satisfy the data characteristic similarity condition with the media data corresponding to the associated images in the selected display information.

17. The medium according to claim 16, wherein the display information further comprises: theme tag information of media data.

18. The medium according to claim 17, wherein the same-level display information comprises one or more of the following:

associated images, which belong to same-level theme tag information as the selected display information;

associated images of first media data with the same associated information as the media data corresponding to associated images in the selected display information;

other associated images, which satisfy the image characteristic similarity condition with the associated images in the selected display information.

19. The medium according to claim 17, wherein the displaying at least part of next-level display information of the selected display information comprises at least one of:

with respect to the theme tag information included in the selected display information, determining the next-level theme tag information corresponding to the theme tag information as next-level display information; or taking partially associated images included in the theme tag information as the next-level display information.

20. The medium according to claim 19, wherein at least one of the determining the next-level theme tag information corresponding to the theme tag information as next-level display information; or taking partially associated images included in the theme tag information as the next-level display information comprises:

determining the next-level theme tag information corresponding to the theme tag information and at least one associated images respectively corresponding to the respective next-level theme tag information, and taking the next-level theme tag information and the corresponding at least one associated images as the next-level display information for associated display.

<center>* * * * *</center>